(12) United States Patent  
Pisoni

(10) Patent No.: US 8,287,217 B2
(45) Date of Patent: Oct. 16, 2012

(54) EXPANSION ANCHOR

(75) Inventor: Roberto Pisoni, Milan (IT)

(73) Assignee: ITW Construction Products Italy S.R.L. Con Unico Socio, Padua (IT)

( * ) Notice: Subject to any disclaimer, the term of this patent is extended or adjusted under 35 U.S.C. 154(b) by 329 days.

(21) Appl. No.: 12/323,936

(22) Filed: Nov. 26, 2008

(65) Prior Publication Data
US 2009/0142156 A1 Jun. 4, 2009

(30) Foreign Application Priority Data

Nov. 29, 2007 (IT) .............................. TO20070146 U

(51) Int. Cl.
F16B 13/06 (2006.01)

(52) U.S. Cl. .............. 411/60.1; 411/46; 411/49; 411/72

(58) Field of Classification Search .................... 411/55, 411/60.1, 57.1, 71, 72, 74, 45, 46, 49, 50
See application file for complete search history.

(56) References Cited

U.S. PATENT DOCUMENTS

| 612,316 A | * | 10/1898 | Downes ........................... 411/55 |
| 1,164,322 A | * | 12/1915 | Yeatman ......................... 411/55 |
| 3,623,396 A | * | 11/1971 | Mortensen ...................... 411/46 |
| 4,481,702 A | | 11/1984 | Mitchell |
| 4,516,885 A | * | 5/1985 | Calandra, Jr. .............. 405/259.6 |
| 4,640,654 A | * | 2/1987 | Fischer et al. .................. 411/55 |
| 4,650,384 A | * | 3/1987 | McIntyre et al. ............... 411/44 |
| 4,806,053 A | * | 2/1989 | Herb ............................... 411/32 |
| 4,984,945 A | * | 1/1991 | Bergner .......................... 411/30 |
| 5,263,803 A | * | 11/1993 | Anquetin ........................ 411/31 |
| 5,702,216 A | * | 12/1997 | Wu ................................. 411/32 |
| 5,993,128 A | * | 11/1999 | Mark et al. ..................... 411/30 |
| 7,150,595 B2 | | 12/2006 | Liebig et al. |

FOREIGN PATENT DOCUMENTS

DE 29615691 U1 10/1996
GB 1537175 A 12/1978

OTHER PUBLICATIONS

EP Search Report for EP 08170292 dated Nov. 30, 2010.

* cited by examiner

Primary Examiner — Flemming Saether
(74) Attorney, Agent, or Firm — Lowe Hauptman Ham & Berner LLP

(57) ABSTRACT

An expansion anchor comprising a tubular body, which extends along a longitudinal axis and displays a deformable end portion on which there are obtained longitudinal slots which divide the end portion itself into a series of anchoring fins, and an expansion nut, which is partially engaged onto said end portion and is adapted to be displaced by a screw so as to radially expand said anchoring fins outwards; each anchoring fin being shaped so as to display an annular ridge on its end and two protruding side teeth, which are arranged on the side edge of said anchoring fin at the two ends of the ridge; each anchoring fin further displaying an external friction surface provided with a plurality of annular notches or cavities coaxial to the longitudinal axis.

14 Claims, 3 Drawing Sheets

EXPANSION ANCHOR

RELATED APPLICATIONS

The present application is based on, and claims priority from, Italian Application Number TO2007U 000146, filed Nov. 29, 2007, the disclosure of which is hereby incorporated by reference herein in its entirety.

The present innovation relates to an expansion anchor.

Specifically, the present innovation relates to an screw anchor adapted to be used for fastening or anchoring onto walls or articles, to which explicit reference will be made in the following description without therefore loosing in generality.

BACKGROUND OF THE INVENTION

Screw anchors are known, comprising a tubular element having a deformable end portion in which longitudinal slits or cuts are obtained, which divide the end portion itself, at the zones concerned by the cuts, into a series of longitudinal anchoring fins; a cone-shaped expansion nut or body engaged onto the end of the end portion; and a screw, which is accommodated inside the tubular element and is adapted to be screwed onto the expansion nut or cone so as to be able to progressively displace it into the end portion of the anchor, so as to cause the radial deformation of the longitudinal fins which, by spreading outwards, determine the anchoring of the anchor to the wall.

Despite their efficiency, the screw anchors of the aforesaid type do not ensure a sufficiently high degree of fastening in some cases.

For this purpose, many efforts have been made during the past years to increase the degree of fastening of the anchors by means of a continuous search of solutions which allow to make the anchoring of the screw anchor to the wall more effective, but many more remain to be done.

SUMMARY OF THE INVENTION

It is the object of the present innovation to make a screw anchor structured so as to ensure a better anchoring/fixing to the wall than the expansion anchors of known type.

BRIEF DESCRIPTION OF THE DRAWINGS

The present innovation will now be described with reference to the accompanying drawings illustrating a non-limitative embodiment thereof, in which:

FIG. 3 shows the screw anchor taken along a section I-I in FIG. 2 on an enlarged scale; while

DETAILED DESCRIPTION OF THE INVENTION

Figure 1:
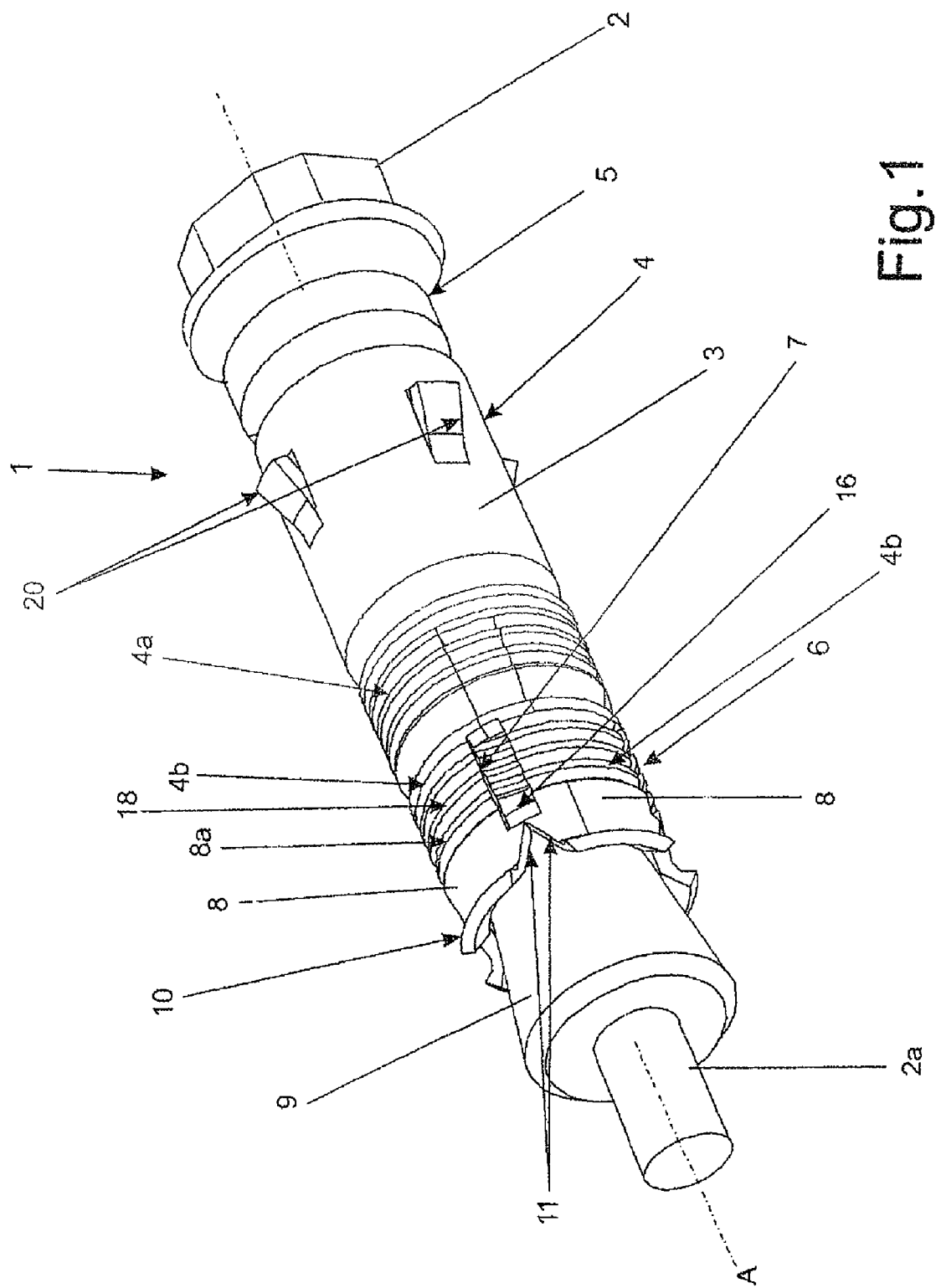
FIG. 1 shows a perspective, enlarged view of an screw anchor made according to the dictates of the present innovation.

With reference to FIGS. 1, 2, 3 and 4, numeral 1 indicates as a whole an screw anchor, which is adapted to be engaged into a hole 25 obtained in a wall 26, or in any body or anchoring element, with the longitudinal axis A thereof coaxial to the axis of the hole 25 itself, and is capable of coupling with a fastening screw 2 of known type which, when actuated, is adapted to cause a deformation of the screw anchor 1 inside the hole 25 so as to determine the anchoring to the wall 26.

The screw anchor 1 essentially consists of a tubular element 3 preferably, but not necessarily, made of metal or plastic material, or of any other similar material, on which the following parts may be identified: a central truck 4; preferably, but not necessarily, a collar 5, and a deformable end portion 6, connected at the opposite ends of the central trunk 4, respectively.

On the end portion 6, longitudinal cuts or slots 7 are obtained which divide the end portion 6 itself, at the zone concerned by the longitudinal slots 7 themselves, into a series of anchoring sectors or fins 8.

The screw anchor 1 further comprises an expansion nut or body 9, which is engaged onto the end portion 6 of the screw anchor 1, on the part opposite to the collar 5, and is adapted to be screwed onto the threaded part of the shank 2a of the screw 2 to be axially displaced inside the end portion 6 of the screw 2 itself, so as to cause the outward radial deformation of the anchoring fins 8.

With reference to FIG. 1, each anchoring fin 8 has an essentially rectangular shape and at its end facing the expansion body 9, displays a ridge 10 defining the external side edge of the anchoring fin 8 and having an essentially triangular cross section.

At the two opposite ends of the ridge 10, along its external side edge, each anchoring fin 8 further presents two protruding side teeth 11 having a pointed shape, each of which is coplanar with the anchoring fin 8 and extends towards the protruding tooth 11 of an adjacent anchoring fin 8, so as to delimit, with the latter, the end of the longitudinal slot 7 present between the two facing side edges of the anchoring fins 8 themselves.

In detail, each protruding side tooth 11 has an essentially triangular shape and extends from the body of the anchoring fin 8 so as to be arranged, with its pointed portion, at least partially in abutment with the pointed portion of the protruding side tooth 11 of the adjacent anchoring fin 8.

As far as the expansion nut or body 8 is concerned, it is preferably, but not necessarily, made of metal or plastic material, or of other similar material, is shaped so as to be essentially cone-shaped, and comprises a threaded through hole 14 which extends coaxially to the axis A and is adapted to accommodate the threaded shank 2a of the screw 2.

Figure 3:
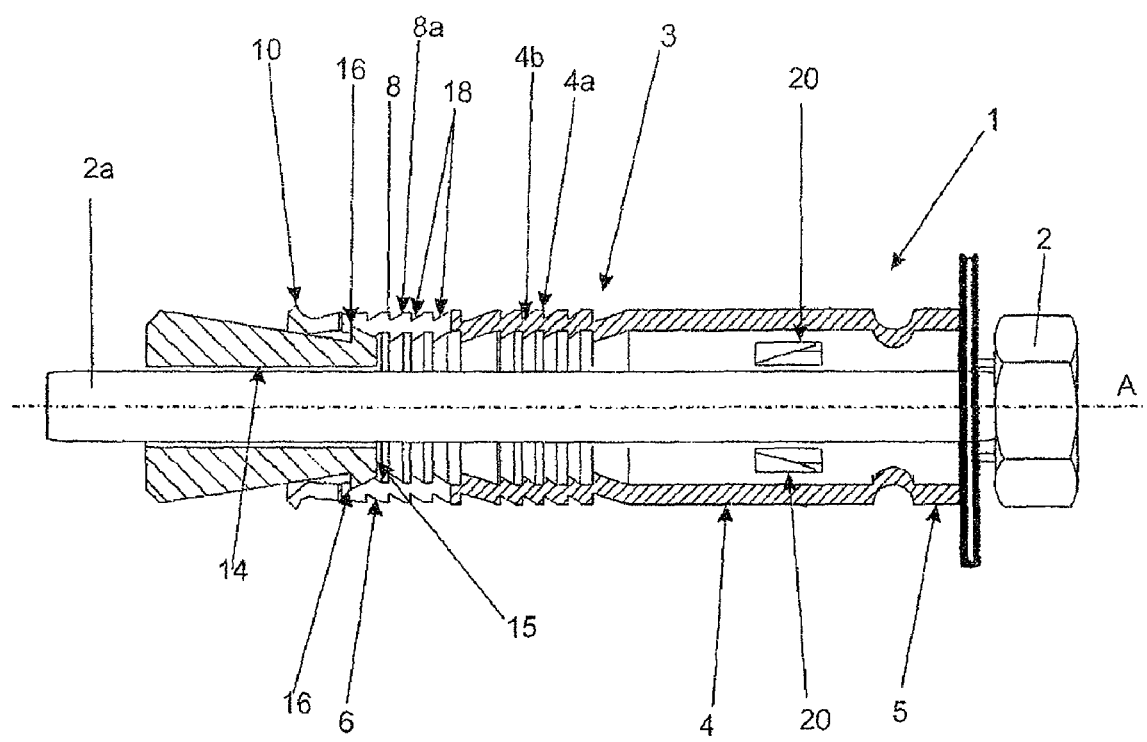

More in detail, in the example shown in FIGS. 1 and 3, at its smaller base, the expansion nut or body 8 displays a portion 15 having an essentially square shape, in which the vertexes of the square define anti-rotation protrusions 16 each of which is engaged inside a corresponding longitudinal slot 7 and is adapted to prevent the expansion nut or body 9 from rotating about the longitudinal axis A.

In this case, in the example shown in FIG. 3, the smaller base of the conical portion of the expansion nut or body 9 is essentially inscribed in the square defining the portion 15, while the vertexes of the portion 15 which define the protrusions 16 of the expansion nut or body 9 are essentially pyramid-shaped so as to be inserted and displaced into the corresponding longitudinal slots 7 when screwing the screw 2 onto the expansion nut or body 9.

Each anchoring fin 8 of the anchor 1 further displays an external surface 8a comprising a plurality of annular notches 18, which are arranged coaxially to the axis A, and essentially equally spaced from each other so as to advantageously increase the degree of friction and grip of the anchoring fins 8 on the internal wall of the hole 25 which accommodates the screw anchor 1.

According to a variant (not shown), each anchoring fin 8 of the anchor 1 has an external knurled or milled surface 8a so as to increase the degree of friction and grip of the anchoring fins 8 on the internal wall of the hole which accommodates the screw anchor 1.

Figure 2:
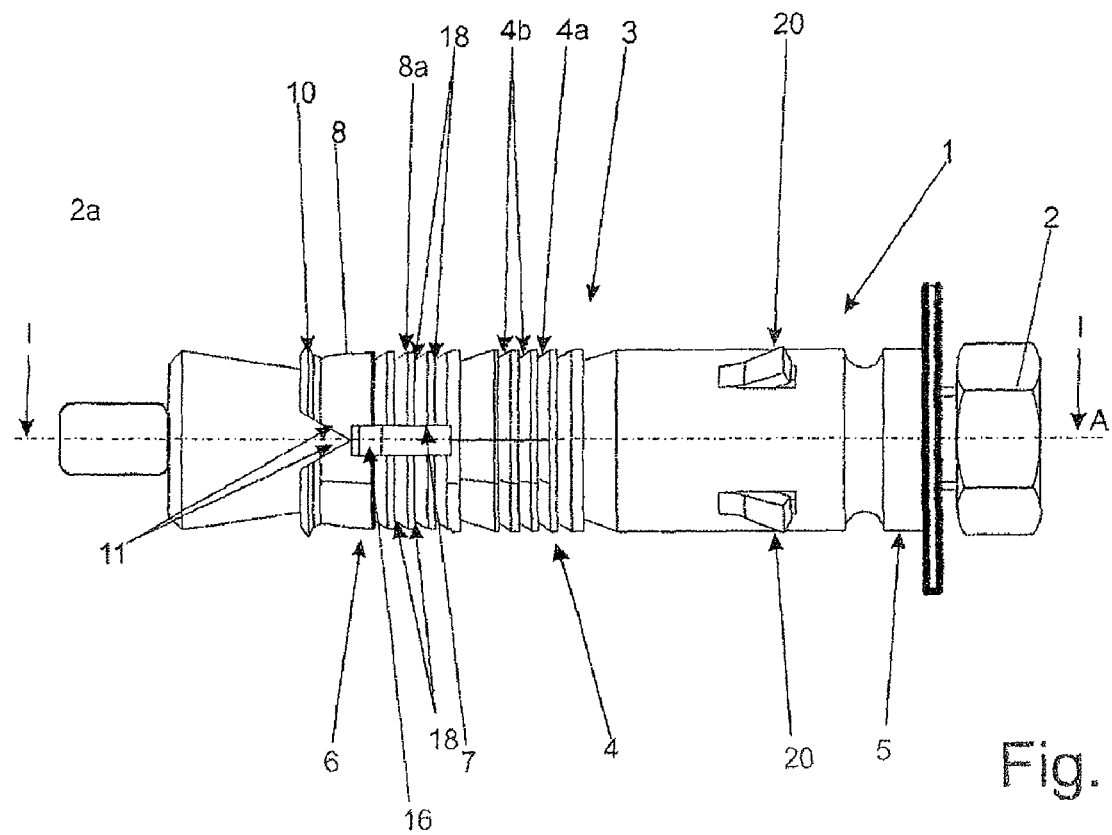
FIG. 2 is a first side view of the screw anchor shown in FIG. 1.

In the example shown in FIGS. 1, 2 and 3, in order to increase the degree of friction of the anchor 1, a segment of the central trunk 4 also displays an external surface 4a having a plurality of annular notches or cavities 4b which are coaxial to the longitudinal axis A and essentially equally spaced from each other along the longitudinal axis A itself.

According to a variant (not shown), the segment of the central trunk 4 of the anchor 1 comprises an external knurled or milled surface 8a so as to increase the degree of friction of the screw anchor 1 on the internal wall of the hole 25.

Anti-rotation ridges 20 are further present on the central trunk 4 of the screw anchor 1, which are arranged in pairs on two reciprocally orthogonal planes laying on the longitudinal axis A, and which overhangingly extend outwards from the central truck 4.

In rest conditions (FIGS. 2 and 3), the expansion nut or body 9 is partially engaged onto the end portion 6 of the screw anchor 1 so that the protrusions 16 of the square portion 15 are inside the corresponding longitudinal slots 7 in a contact position with the base of the protruding teeth 11 of the anchoring fins 8. In other words, the protruding side teeth 11 keep the longitudinal slots 7 closed.

Figure 4:
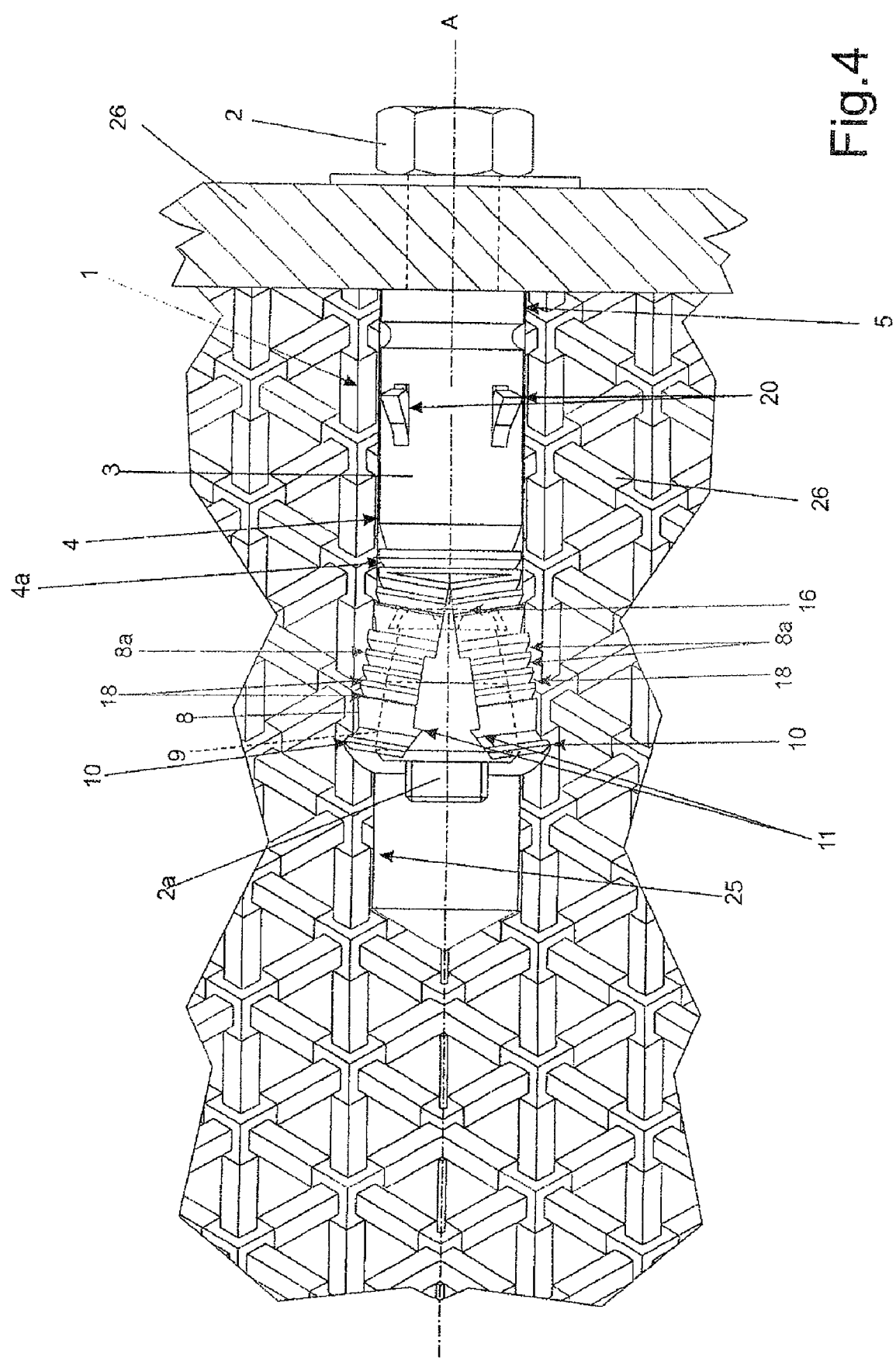
FIG. 4 shows a diagrammatic side view of the screw anchor in an operative condition of expansion of the end part thereof.

With reference to FIG. 4, screwing the screw 2 on the expansion nut or body 9 causes the displacement of the expansion body 9 itself inside the end portion 6, which by radially pushing the anchoring fins 8 outwards determines the expansion of the end portion 6 itself into the hole 25 of the wall 26.

During the expansion caused by the expansion nut or body 9, the ridge 10 of each anchoring fin 8 is brought in abutment with the internal wall of the hole 25, while the protruding teeth 11 of the anchoring fin 8 are partially driven into the internal wall of the hole 25 itself, thus creating a pawl anchoring system which then counters the axial displacement of the screw anchor 1 in the direction for extracting the screw anchor 1 from the hole 25.

In this step, the external surface 8a of the anchoring fins 8 is brought in contact with the internal wall of the hole, thus generating, in virtue of the notches or cavities 18 thereof, a friction force which counters the axial displacement of the screw anchor 1 in the direction for extracting the anchor from the hole 25.

The above-described screw anchor 1 has the advantage of ensuring a particularly high degree of anchoring; indeed, the combined action of the anchoring performed by the protruding side teeth and the friction obtained by the notches of the external surface of the anchoring fins 8 ensures an excellent fixing of the anchor to the wall.

It is finally apparent that changes and variations may be made to the expansion anchor 1 described and shown herein without therefore departing from the scope of the present innovation.

The invention claimed is:

1. An expansion anchor, comprising:
    a tubular body, which extends along a longitudinal axis and comprises a deformable end portion that includes
        a series of anchoring fins, and
        slots elongated in the longitudinal axis and dividing the end portion into said series of anchoring fins; and
    an expansion nut which is engaged onto said end portion and is configured to be displaced along said longitudinal axis to radially expand said anchoring fins,
    wherein
    each anchoring fin comprises
        a ridge on an end thereof, and
        two protruding side teeth at opposite ends of said ridge, and
    each protruding side tooth extends in a circumferential direction toward the protruding side tooth of an adjacent anchoring fin, and has a pointed portion in abutment with that of the protruding side tooth of the adjacent anchoring fin.

2. An expansion anchor according to claim 1, wherein each anchoring fin further comprises an external friction surface including a plurality of annular notches coaxial to said longitudinal axis and essentially equally spaced from each other.

3. An expansion anchor according to claim 2, wherein
    said protruding side teeth are essentially triangular-shaped, and
    said two protruding side teeth of the adjacent anchoring fins, which abut one another, close an end of said longitudinal slots.

4. An expansion anchor according to claim 1, wherein each anchoring fin has an external surface that is knurled or milled friction.

5. An expansion anchor according to claim 1, wherein
    said ridge has a pointed shape in a cross-section view with respect to said longitudinal axis.

6. An expansion anchor according to claim 1, wherein said expansion nut is essentially in the shape of a truncated cone and has anti-rotation protrusions which protrude outwardly in a radial direction and are inside said longitudinal slots.

7. An expansion anchor according to claim 1, wherein said tubular body further comprises a central portion connected with the deformable end portion and having an external surface comprising a plurality of annular notches coaxial to said longitudinal axis.

8. An expansion anchor according to claim 1, wherein said tubular body further comprises a central portion connected with the deformable end portion and having an external surface that is at least partially knurled or milled.

9. An expansion anchor according to claim 1, wherein said tubular body and/or said expansion nut are made of metal.

10. An expansion anchor according to claim 1, wherein said tubular body and/or said expansion nut are made of plastic material.

11. The expansion anchor of claim 1, wherein
    the tubular body slopes at an angle from the ridge to a remaining portion of the tubular body.

12. An expansion anchor, comprising:
    a tubular body, having a longitudinal axis and including a deformable end portion that includes
        a series of anchoring fins, and
        slots elongated in the longitudinal axis and dividing the end portion into said series of anchoring fins,
    wherein each anchoring fin has
        a ridge on an end thereof; and
        two protruding side teeth at opposite ends of said ridge; and
    an expansion nut which is configured to be engaged onto said end portion and to be displaced along said longitudinal axis to radially expand said anchoring fins,
    wherein each protruding side tooth extends from in a circumferential direction toward the protruding side tooth of an adjacent anchoring fin,
    wherein said two protruding side teeth of the adjacent anchoring fins converge toward each other and toward an end of the slot located between the adjacent anchoring fins, and wherein said two protruding side teeth of the adjacent anchoring fins define a V-shape.

13. The expansion anchor of claim 12, wherein the tubular body slopes at an angle from the ridge to a remaining portion of the tubular body.

14. An expansion anchor, comprising:
a tubular body, having a longitudinal axis and including a deformable end portion that includes
 a series of anchoring fins, and
 slots elongated in the longitudinal axis and dividing the end portion into said series of anchoring fins,
wherein each anchoring fin has
 a ridge on an end thereof; and
 two protruding side teeth at opposite ends of said ridge; and an expansion nut which is configured to be engaged onto said end portion and to be displaced along said longitudinal axis to radially expand said anchoring fins,
wherein each protruding side tooth extends from in a circumferential direction toward the protruding side tooth of an adjacent anchoring fin,
wherein said two protruding side teeth of the adjacent anchoring fins converge toward each other and toward an end of the slot located between the adjacent anchoring fins, and
wherein said two protruding side teeth of the adjacent anchoring fins are in abutment with each other.

* * * * *